March 31, 1970   H. R. WEBER ET AL   3,503,722
BLENDING SYSTEM
Original Filed Nov. 2, 1962   2 Sheets-Sheet 1
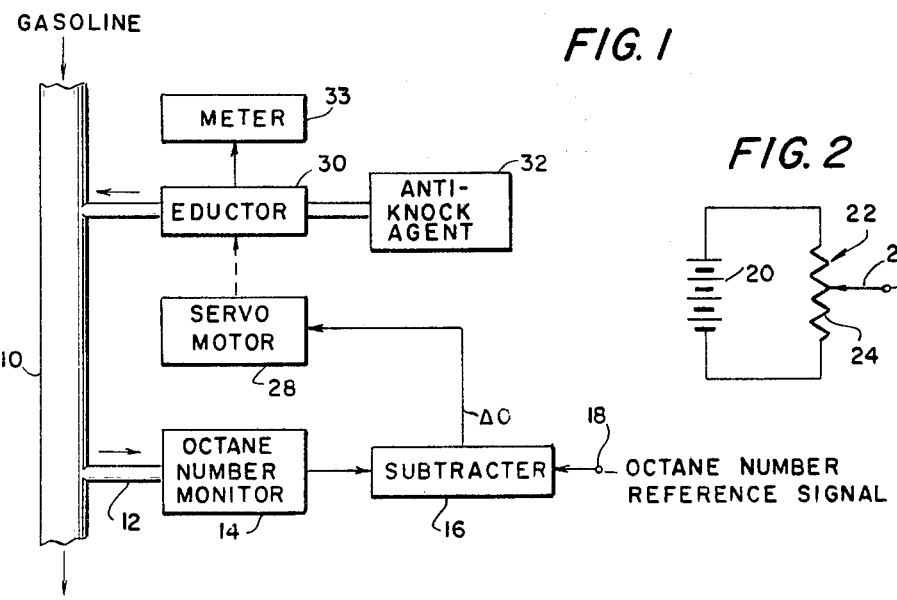
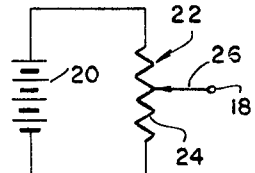
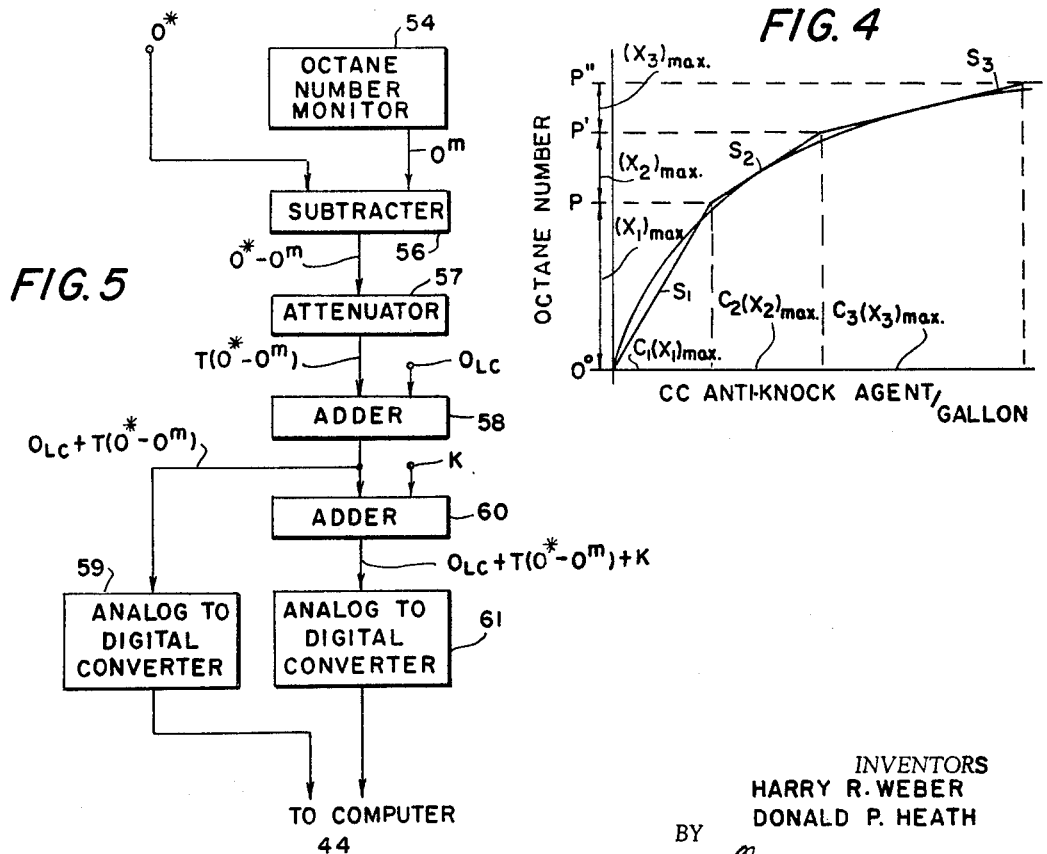
INVENTORS
HARRY R. WEBER
DONALD P. HEATH
BY
Oswald M. Hayes
ATTORNEYS

United States Patent Office 3,503,722
Patented Mar. 31, 1970

3,503,722
BLENDING SYSTEM
Harry R. Weber, Haddon Township, Camden County, and Donald P. Heath, Pitman, N.J., assignors to Mobil Oil Corporation, a corporation of New York
Continuation of application Ser. No. 235,060, Nov. 2, 1962. This application Aug. 13, 1968, Ser. No. 755,017
Int. Cl. C10l 1/04
U.S. Cl. 44—2                                                                5 Claims

ABSTRACT OF THE DISCLOSURE

A fuel product stream is blended in-line from a plurality of component streams by powering a knock test engine with a sample stream of the fuel product, and generating a signal representative of the knocking propensity of the sample powering the engine. An error signal representative of the deviation of the knocking propensity signal from a predetermined knocking propensity is generated and the relative proportions of the component streams are modified in response to a function of the error signal to reduce the error signal.

---

This application is a continuation of application Ser. No. 235,060, filed Nov. 2, 1962, and now abandoned.

This invention relates to the blending of a fuel product and, more particularly, to the automated blending of an automotive fuel product so that it meets a predetermined specification.

In the blending of gasoline, an important characteristic of the blended product which must be maintained at a predetermined specification is its octane number. A gasoline has a number of combustion characteristics. One such characteristic, its propensity to knock, is a function of the octane number. Heretofore, there has been a great deal of difficulty encountered in accurately determining the octane number of a gasoline. The typical testing procedure has involved a standard ASTM–CFR knock test engine which is supplied with a gasoline to be tested and which is manually operated to develop a signal representative of the knocking quality, i.e., the octane number of the gasoline.

Such a testing procedure precludes the complete automation of the blending process, since the test itself involves manual steps. Further, other manual steps are involved, such as the removal by hand of a representative sample of the blended fuel, a transfer of the sample to a laboratory wherein it is tested, and a relaying of information regarding the test to a blending operator.

Recently, however, the techniques involved in the monitoring of a gasoline to determine its octane number have been greatly improved so that there are now available for use highly developed and reliable automatic monitors. Such automatic monitors are disclosed in the copending applications of William E. Beal and Alfred E. Traver, Ser. Nos. 160,051, now Patent No. 3,238,765, and 160,052, now Patent No. 3,312,182, respectively, both filed Dec. 18, 1961 for "Apparatus for Determining the Combustion Quality of a Fuel" and "Automotive Engine for Determining the Combustion Quality of a Fuel," respectively, both of which have a common assignee with the instant application.

Briefly, such monitors comprise a single cylinder internal combustion engine, such as a standard ASTM–CFR engine, with an automatic regulating system that continuously varies a variable element to control an operating condition of the engine (e.g., engine compression ratio) so as to maintain substantially constant a particular aspect of the combustion process (e.g., knock in the engine) of the fuel used to power the engine. A knock sensing device provides a signal which is used to control motive means to adjust the compression ratio of the engine so as to maintain a predetermined standard knocking condition in the engine. A transducer provides a signal representing the adjustment of the compression ratio, which signal is representative of the knocking propensity (i.e., the octane number) of the fuel powering the engine.

Such improved octane number monitors lend themselves to the automatic blending of automotive fuels. Accordingly, the present invention is directed toward the automatic monitoring and blending of an automotive fuel in accordance with octane number. This is accomplished in an illustrative embodiment of the present invention by the use of an octane number monitor which continuously monitors a gasoline and which develops a continuous signal representative of the octane number of the gasoline. This signal is compared with a reference signal that represents an octane number desired for the gasoline, and an error signal is thus developed that controls a variable such as the amount of a component of the gasoline (a non-bulk anti-knock agent, for example) that is added to the blend. In this fashion, a blending process is automatically varied so that the octane number of the gasoline continuously meets specifications.

In a blending system wherein a gasoline product is blended from a plurality of component products, a plurality of octane number monitors or sensing means may be utilized, one of which monitors the finished blend of gasoline and the others of which monitor the individual components of the blend. Signals from the monitors are applied to a computer which is supplied with signals representative of flows of components to the blending area as well as other blending data, such as cost factors regarding the individual components and other limitations regarding the use of such components, for example. The computer manipulates the information supplied thereto and selects a blend of gasoline that will meet a predetermined specification regarding octane number as well as other constraints imposed thereon, which may include a cost restraint such that the blend is provided at minimum cost.

A detailed description follows of a representative embodiment of the invention described generally above, which is to be read in conjunction with the appended drawings, in which:

FIG. 1 is a block diagram of an illustrative blending system in accordance with the invention;

FIG. 2 is a schematic diagram of a reference signal generator useful with the apparatus of FIG. 1;

FIG. 4 is a typical anti-knock agent susceptibility curve showing octane number of a blended fuel versus the concentration of anti-knock agent; and FIG. 5 is a block diagram of a circuit useful in the system of FIG. 3.

Figure 3:
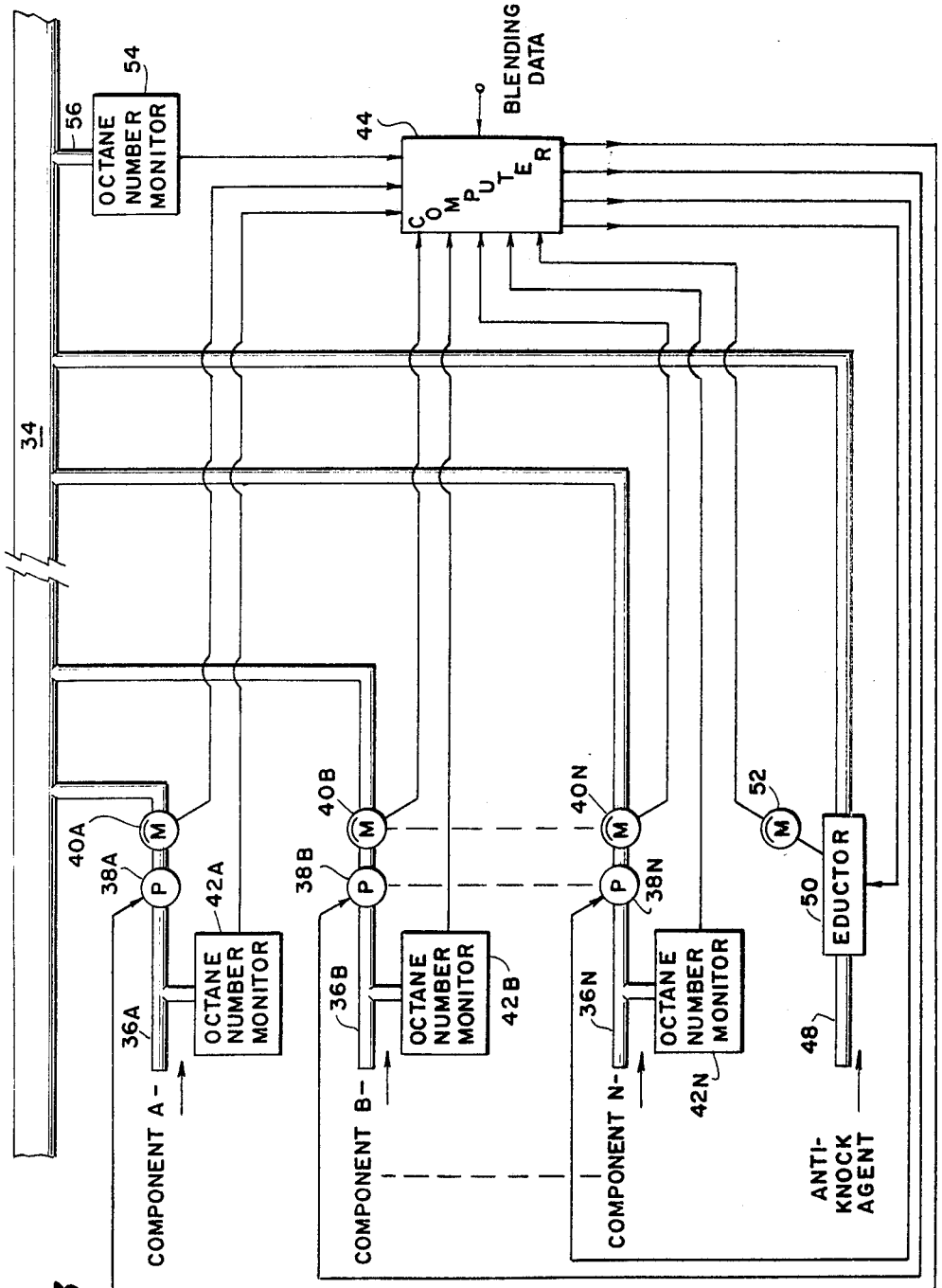
FIG. 3 is a block diagram of another illustrative blending system in accordance with the invention.

Referring to FIG. 1, a stream of gasoline is shown flowing in a blending line 10. An inlet conduit 12 conducts a portion of the gasoline to an octane number monitor 14 which may be of the type shown in either one of the Beal and Traver applications referred to above. The octane number monitor 14, develops a reliable signal representative of the octane number of the gasoline flowing in the line 10.

A signal from the octane number monitor 14 is applied to a subtracter 16 which is also supplied with a signal from a terminal 18 representative of the octane number desired for the gasoline in the blending line 10. This latter signal may be developed by a circuit such as that shown in FIG. 2. Referring to that figure, a battery 20 is connected across a potentiometer 22 which is formed from a resistor 24 and an adjustable tap 26. Suitable variation of the tap 26 results in the generation of any one of a number of different potentials at the terminal 18 which may be taken to represent any one of a number of predetermined reference octane numbers.

Referring again to FIG. 1, the output signal from the error-signal means or subtracter 16 is representative of the deviation of the octane number of the gasoline in the line 10 from the reference established for the gasoline. This constitutes an error signal which is applied to control means such as a servo-motor 28, the output of which is coupled to an eductor 30. The eductor applies a varying amount of a component, which typically may be an anti-knock agent such as tetraethyl lead (TEL), for example, from a source 32 to the line 10 to be added to the gasoline in accordance with the control established by the servo-motor 28. In this fashion, the servo-motor regulates the setting of the eductor 30 in response to the error signal from the subtracter 16 and varies the amount of anti-knock agent applied to the stream of gasoline so that the gasoline stream continuously meets specification regarding its octane number. A meter 33 provides an indication of the amount of component added to the gasoline.

In this regard, the conduit 12 leading to the octane number monitor 14 should be as close as possible to the point in the blending line 10 at which the anti-knock agent is admitted to the gasoline stream. At the same time it should be far enough away so that the gasoline and the component added thereto are thoroughly mixed. In actual practice, this need be a distance of only a few feet and, therefore, the difference between the time at which the anti-knock agent is admitted to the gasoline stream and the time at which the octane number monitor detects the octane number of this portion of the gasoline is so short as to be practically instantaneous. For this reason, the octane number monitor can continuously regulate through the action of the subtracter 16, the servo-motor 28, and the eductor 30 the amount of anti-knock agent that is added to the gasoline stream to ensure that the stream meets the predetermined octane number specification.

Thermofor catalytic cracked (TCC) gasoline, alkylate, reformate, and butane.

The components A, B . . . N are monitored by octane number monitors 42A, 42B . . . 42N, respectively, each of which determines the octane number of the respective component and each of which applies a signal representative of that octane number to a computer 44. The computer is also supplied with signals from the meters 40A, 40B . . . 40N representative of the flows of components to the blending area 34.

The blending line 34 is also supplied with a non-bulk anti-knock agent such as TEL, for example, which is applied thereto through a conduit 48 and an eductor 50. A meter 52 coupled to the eductor 50 determines the amount of anti-knock agent that is introduced into the blending area 34 and generates a signal that is transmitted to the computer 44.

An octane number monitor 54 is coupled to the blending area 34 by a conduit 56 and continuously samples the finished blend of gasoline in the blending area. The signal generated by the monitor 54 is representative of the octane number of the blended gasoline, and this signal is applied to the computer 44.

Also applied to the computer 44 are signals representative of blending data, such as costs of components (cost data) and limitations regarding their use, for example, which are handled by the computer in addition to the other signals supplied thereto to compute a blend of gasoline which continuously meets specification regarding octane number. Thus, the computer 44 generates a series of output signals which are applied to the eductor 50 and the pumps 38A, 38B . . . 38N to control the amounts of anti-knock agent and bulk components, respectively, that are applied to the blending area to form the blend of gasoline.

The computer 44 may be any conventional computer such as a general purpose digital computer of the type represented by an IBM 650 or a Bendix G-30, for example. Table 1, as follows, is a simple data matrix for the computer 44 which tabulates the information that is handled by the computer as well as the relationships involved.

TABLE 1.—SAMPLE DATA MATRIX FOR COMPUTING BLEND COMPOSITION

| Constraints | Component fractions | | Anti-knock agent curve segments | | | Specification Values |
|---|---|---|---|---|---|---|
| | $X_A$ | $X_B \ldots X_D$ | $X_1$ | $X_2$ | $X_3$ | |
| Octane number | $O_A$ | $O_B \ldots O_D$ | +1 | +1 | +1 | $\begin{cases} \geq Oxk+T(0^*-0\S) \\ \leq Oxk+T(0^*-^*\S)+K \end{cases}$ |
| Anti-knock agent segment (1) limit | $K_A$ | $K_B \ldots K_D$ | +1 | | | $\leq P$ |
| Anti-knock agnet segment (2) limit | $K_A$ | $K_B \ldots K_D$ | | +1 | | $\leq P'$ |
| Anti-knock agent segment (3) limit | $K_A$ | $K_B \ldots K_D$ | | | +1 | $\leq P''$ |
| Optimizing criteria (e.g., costs) | \$/$B_A$ | \$/$B_B \ldots$ \$/$B_D$ | \$/$X_1$ | \$/$X_2$ | \$/$X_3$ | Minimize |
| Production requirement | +1 | +1 . . . +1 | | | | =1 |

Referring to FIG. 3, there is shown a system for the blending of a blended product fuel substance such as gasoline from a plurality of fuel components or ingredient substances in accordance with the octane numbers of the finished blend of gasoline and the component products, as well as blending data and other information that is applied to the computer. A blending area or line 34 is shown in which a plurality of components are introduced to form a blend of gasoline. Thus, a plurality of bulk components A, B . . . N are pumped through conduits 36A, 36B . . . 36N by pumps 38A, 38B . . . 38N and thence through meters 40A, 40B . . . 40N to the blending area 34. A typical blend of premium gasoline, for example, might comprise the four bulk components In Table 1, $X_A$, $X_B$ . . . $X_N$ represent the fractions of the total blend accounted for by the bulk components A, B . . . N, respectively. $X_1$, $X_2$, and $X_3$ represent portions of projections of straight line segments that approximate the curve graphically defining octane number of a blend of gasoline in terms of the concentration of anti-knock agent in the blend. Such a curve is shown in FIG. 4, and is approximated by three linear segments $S_1$, $S_2$, and $S_3$ having projections $X_{1\ (max)}$, $X_{2\ (max)}$, and $X_{3\ (max)}$ on the octane number axis. This technique is described in detail in an article entitled, "Applications of Linear Programming in the Oil Industry," by W. W. Garvin, H. W. Crandall, J. B. John, and R. A. Spellman (3 Management Science No. 4, pages 407–430, July 1957). Of course, any number of linear segments may be chosen to approximate the actual curve.

Thus, the octane number (0) of the finished blend of fuel is expressed by the following relation:

$$0(X_A+X_B+ \ldots X_N)=0°_AX_A+0°_BX_B+ \ldots 0°_NX_N \\ +(X_1+X_2+X_3)(X_A+X_B+ \ldots X_N) \quad (1)$$

where $0°_A$, $0°_B \ldots 0°_N$ are the octane numbers of the A, B ... N bulk components, respectively, without any anti-knock agent added thereto, and $X_A$, $X_B \ldots X_N$, $X_1$, $X_2$, and $X_3$ are as defined above. The dimensions of the terms are all octane fractions.

Because the anti-knock agent is a non-bulk component and assumes a negligible volume fraction of the total finished blend of gasoline, the factor $X_A+X_B+ \ldots X_N$ is equal to 1, and relation (1) therefore may be rewritten as follows:

$$0=0°_AX_A+0°_BX_B+ \ldots 0°_NX_N+X_1+X_2+X_3 \quad (2)$$

Given a set of values $X_A$, $X_B \ldots X_N$ in relation (2), the response of the blend to anti-knock agent is graphically shown in FIG. 4, where the base level 0° of the octane number axis is equal to the expression $$0°_AX_A+0°_BX_B+ \ldots 0°_NX_N$$

in relation (2). For this blend of gasoline formed with a particular concentration of anti-knock agent, represented by a point on the curve of FIG. 4, the corresponding octane number addition is determined from the projection of the point on the octane number axis. If the point lies on the curve segment $S_1$, $X_1$ has a value between zero and $(X_1)_{(max)}$, and $X_2$ and $X_3$ are equal to zero. If the point lies on the segment $S_2$, $X_1$ is equal to $(X_1)_{(max)}$, $X_2$ has a value between zero and $(X_2)_{(max)}$, and $X_3$ is equal to zero. If the point lies on the segment $S_3$, $X_1$ is equal to $(X_1)_{(max)}$, $X_2$ is equal to $(X_2)_{(max)}$, and $X_3$ has a value between zero and $(X_3)_{(max)}$.

Relation (2) may also be expressed as follows:

$$0°_AX_A+0°_BX_B+ \ldots 0°_NX_N+X_1+X_2+X_3 \\ \geq 0_{LC}+T(0^*-0^m) \quad (3)$$

where $0_{LC}$ is the octane number last computed for the blend, $0^*$ is the octane number desired for the blend, $0^m$ is the octane number actually measured for the blend, and T is an attenuation factor between zero and 1.

The factor $(0^*-0^m)$ represents the deviation of the octane number of the finished blend of fuel from the octane number desired for the blend. Therefore, relation (3) indicates that the octane number of the finished blend must be greater than or equal to the octane number computed for the blend when the previous change in octane number was effected plus the present octane number deviation times the attenuation factor T. The attenuation factor ensures that any correction made for octane number deviation will be less than that theoretically required to correct for the entire deviation. In this fashion, entire corrections are made in more than one step, which prevents excessive "hunting" and wide oscillations that might occur if the system attempted to correct deviations in a single step.

Bearing relation (3) in mind, the following relation may be written:

$$0°_AX_A+0°_BX_B+ \ldots 0°_NX_N+X_1+X_2+X_3 \\ \geq 0_{LC}+T(0^*-0^m)+K \quad (4)$$

where K is a predetermined constant.

Relation (4) indicates that the octane number of the finished blend must not exceed the lower limit of the newly computed octane number of the blend, as expressed by the right-hand side of relation (3), by more than a predetermined constant K, which represents the quality "give-away" that may be tolerated. It should be noted that quality give-away is costly, and, therefore, it is highly desirable to limit the amount by which the octane number of the finished blend may exceed its predetermined specification. Since the system is optimizing as will be shown, octane number give-away will only occur to the extent that it is necessary to meet the other requirements and constraints established for the system. In actual practice, then, with the flexibility available to change anti-knock concentration, octane number give-away is never really a problem. However, from a blending technology standpoint, the maximum limitation on octane number as expressed by relation (4) is extremely useful.

In Table 1, the factors involved in relations (3) and (4), respectively, are included in the row entitled "Octane Number."

Signals representative of the factors $0°_A$, $0°_B \ldots 0°_N$, i.e., the octane number characteristics of the bulk blend components without the addition of any anti-knock agent, are generated by the octane number monitors 42A, 42B ... 42N of FIG. 3, and these signals are applied to the computer 44 as indicated above. An analog to digital converter (not shown), of any suitable conventional form, may be needed, however, to convert these signals to a form suitable for handling by the computer 44 if it is a digital computer.

Signals representative of the factors $0_{LC}+T(0^*-0^m)$ and $0_{LC}+T(0^*-0^m)+K$ from Table 1, which represent the octane number specification values for the computer, may be generated by a circuit similar to that shown in FIG. 5. Referring to that figure, the octane number monitor 54 applies a signal representative of the quantity $0^m$ to a subtracter 56, to which is also applied a signal representative of the quantity $0^*$. This latter signal may be generated by a circuit similar to that shown in FIG. 2.

The output signal from the subtracter 56, which is representative of the octane number deviation $0^*-0^m$, is applied through an attenuator 57, which modifies the signal by the factor T, to an adder 58. The attenuator 57 may take the form of a potentiometer (not shown) which reduces the input signal by a fraction that may vary between zero and 1.

Also applied to the adder 58 is a signal in analog form from the computer 44 representative of the factor $0_{LC}$ from Table 1. This latter signal is stored in the computer and is representative of the octane number computer for the previous blend change. The output signal from the adder 58, then, is representative of the expression in the right-hand side of relation (3), i.e., $0_{LC}+T(0^*-0^m)$, and defines a lower limit for the newly computed octane number of the blend. This signal is applied to the computer 44 after passing through an analog to digital converter 59 to provide a signal suitable for handling by the computer if it is a digital computer.

The signal from the adder 58 is also applied to an adder 60 that is supplied with a signal representative of the quantity K from Table 1 that may be generated by the circuit of FIG. 2. Thus the output signal from the adder 60 is representative of the expression in the right-hand side of relation (4), i.e., $0_{LC}+T(0^*-0^m)+K$, and represents an upper limit on the newly computed octane number of the finished blend. This signal is applied to an analog to digital converter 61, if necessary, and thence to the computer 44.

Table 1 incorporates data regarding a limitation on the length of each of the three anti-knock agent linear curve segments $S_1$, $S_2$, and $S_3$ of FIG. 4. In Table 1, this data is included as a limitation on the maximum magnitude of each of $X_1$, $X_2$, and $X_3$, i.e., $(X_1)_{max}$, $(X_2)_{max}$, and $(X_3)_{max}$, respectively, which, as explained above, are projections on the octane number axis of the linear segments $S_1$, $S_2$, and $S_3$, respectively. Regarding $X_1$, the following relation may be written:

$$K_A X_A + K_B X_B + \ldots K_N X_N + X_1 \leqq P \qquad (5)$$

where $K_A$, $K_B$ ... $K_N$ are predetermined constants relating the blend composition, formed from particular quantities of the A, B ... N bulk components, respectively, with the maximum octane improvement that can be obtained as a result of adding anti-knock agent at the rate shown by the first segment $S_1$ in FIG. 4. The limit thus imposed on $X_1$ is given by P, which is an empirically determined constant in the linear relationship between blend susceptibility to anti-knock agent and the maximum permissible length of segment $S_1$ projected as $X_1$ on the octane axis. The constant P can have either a positive or negative value.

The factors in relation (5) are included in Table 1 in the row entitled "Anti-Knock Agent Segment (1) Limit." Signals representative of all these factors may be generated by circuits similar to that shown in FIG. 2, since the signals are all predetermined and fixed for any particular computation. A suitable analog to digital converter (not shown) may be required in the event that the computer 44 is a digital computer.

Similarly, regarding $X_2$:

$$K'_A X_A + K'_B X_B + \ldots K'_N X_N + X_2 \leqq P' \qquad (6)$$

where $K'_A$, $K'_B$ ... $K'_N$ are predetermined constants relating the blend composition, formed from the predetermined quantities of A, B ... N bulk components, respectively, in the computation regarding the segment $S_1$ limit, with the maximum octane improvement that can be obtained as a result of adding anti-knock agent at the rate shown by the second segment $S_2$ in FIG. 4. P' represents the limit thus imposed on $X_2$.

In this regard, the segment $S_2$ is related to $S_1$ as follows. If the limit P imposed on $X_1$ falls short of providing a predetermined octane number, and more octane number is achieved by adding anti-knock agent, the agent is added according to the slope of the second segment $S_2$. As may be noted, more anti-knock agent must be used to give an improvement of one octane number in the second segment than is required in the first segment.

The factors of relation (6) are included in Table 1 in the row entitled "Anti-Knock Agent, Segment (2) Limit." Since the factors in the relation are all constant, the signals representing them which are applied to the computer 44 may be generated, for example, by circuits similar to that shown in FIG. 2.

Finally, regarding $X_3$:

$$K''_A X_A + K''_B X_B + \ldots K''_N X_N + X_3 \leqq P'' \qquad (7)$$

where $K''_A$, $K''_B$ ... $K''_N$ are predetermined constants relating the blend composition formed from the predetermined quantities of A, B ... N bulk components, respectively, in the computations regarding the limits of segments $S_1$ and $S_2$, with the maximum octane improvement that can be obtained as a result of adding anti-knock agent at the rate shown by the third segment $S_3$ in FIG. 4. P'' represents the limit thus imposed on $X_3$.

In this regard, the segment $S_3$ is related to the segments $S_1$ and $S_2$ as follows. If the limits P and P' imposed on $X_1$ and $X_2$, respectively, fall short of providing a predetermined octane number, and more octane number is achieved by adding anti-knock agent, the agent is added according to the slope of the third segment $S_3$. As may be noted, more anti-knock agent must be used to give an improvement of one octane number in the third segment $S_3$ than is required in either the first segment $S_1$ or the second segment $S_2$.

The factors of relation (7) are included in Table 1 in the row entitled "Anti-knock Agent, Segment (3) Limit." Signals representative of these factors may be generated by circuits similar to that shown in FIG. 2 and are applied to the computer 44.

Table 1 includes data regarding optimizing criteria, for example, such as costs, which are to be minimized in the blending process at the same time that changes are effected to maintain the product in accord with specifications. The expressions $\$/B_A$, $\$/B_B$ ... $\$/B_N$ represent the costs expressed in dollars per barrel, for example, of the A, B ... N bulk components, respectively. Similarly, the cost of the anti-knock agent is expressed in terms of its linear curve segments, with $\$/X_1$, $\$/X_2$, and $\$/X_3$ representing the costs expressed in dollars per octane barrel, for example, of the curve segments represented by $X_1$, $X_2$, and $X_3$, respectively. Table 1 indicates in the column entitled "Specification Values" that costs are to be minimized.

Signals representative of the factors involved in the cost constraint are applied to the computer 44 and may be generated by cost-data means such as circuits similar to that shown in FIG. 2, after passing through a suitable analog to digital converter (not shown), if necessary to accommodate a digital computer. The signals representative of the cost factors may be changed as desired to reflect changing conditions in the refinery operations that result in changes in availability or difficulty in manufacture of individual components, for example. Thus, when an otherwise readily available component is temporarily scarce due to unforeseen events in refinery operation, for example, the cost of the appropriate component can be temporarily increased. Computation techniques are known and currently used by refinery technicians for establishing appropriate relative values for $\$/B_A$, $\$/B_B$ ... $\$/B_N$ to represent any refinery situation whether normal or abnormal.

Finally, Table 1 includes a constraint entitled "Production Requirement." This expresses the requirement that the sum of the computed volume fractions $X_A$, $X_B$ ... $X_N$ total 1. In the system of FIG. 3, this is programmed directly into the computer 44.

As may be seen, then, Table 1 includes data pertinent to all the octane number characteristics of the fuel products that are monitored and according to which blending is effected, as well as cost or other constraints that are to be met. Signals representing these data are applied to the computer 44, as shown in FIG. 3, and the computer is programmed with a general linear program for handling the data of Table 1 and for performing the computations indicated. The book, "Introduction to Linear Programming" by W. W. Garvin (McGraw Hill Book Co., 1960), especially in chapter 3, explains the actual computational procedure that is followed by the computer to solve the equations represented by the data matrix of Table 1. The detailed program itself that effects this computational procedure is a general program such as may be written by anyone skilled in the art.

The programmed computer 44 manipulates the information of Table 1 and produces a series of output signals representative of the fraction of the blend to be established for each of the A, B ... N components, as well as the concentration of anti-knock agent, to correct for the deviation in octane number and to establish the blend at a minimum cost. The signals from the computer represent $X_A$, $X_B$ ... $X_N$, $X_1$, $X_2$, and $X_3$. Regarding the signals $X_A$, $X_B$ ... $X_N$, which are representative of the fractions of the total volume to be established in the finished blend for the A, B ... N bulk components, respectively, the signals are applied to the pumps 38A, 38B ... 38N to establish the component flows to the blending area 34.

Insofar as $X_1$, $X_2$, and $X_3$, are concerned, the computer 44 converts the signals representative of these factors, which have the dimensions of octane fractions, to a single signal representative of the sum:

$$C_1 X_1 + C_2 X_2 + C_3 X_3 = L \qquad (8)$$

where $C_1$, $C_2$, and $C_3$ are predetermined constants that relate $X_1$, $X_2$, and $X_3$, respectively, to the amount of anti-knock agent (L) in cc./gal., for example, to be added to the blend. In particular, referring to FIG. 4, $C_1(X_1)_{max}$ is the projection on the anti-knock agent axis of the linear segment $S_1$, and $C_1$ may be computed from the well-known relationships regarding the right triangle formed by $(X_1)_{max}$, $S_1$, and $C_1(X_1)_{max}$. Similarly, $C_2(X_2)_{max}$ and $C_3(X_3)_{max}$ are the projections on the anti-knock agent axis of the linear segments $S_2$ and $S_3$, respectively.

The single signal representative of L in relation (8) is applied to the eductor 50 of FIG. 3 to control the amount of anti-knock agent that is applied to the blending area 34.

The computations indicated above which are carried out by the computer 44, and the control of the pumps 38A, 38B . . . 38N as well as the eductor 50, are repeated at any desired frequency, and the finished blend, as well as the component products, are continuously monitored by the octane number monitors 54 and 42A, 42B . . . 42N, respectively. In this regard, the signals from the meters 40A, 40B . . . 40N and 52 may be used to check actual component flows against control settings, as well as for other general monitoring purposes.

Thus, there have been described two illustrative systems for the blending of a fuel product from a plurality of component products in accordance with the octane number of one or more of the products. In addition, costs or other such data may be taken into account in the blending control.

It will be understood by those skilled in the art that the above described embodiments are merely exemplary and that they are susceptible of modification and variation without departing from the spirit and scope of the invention. For example, although the embodiments described above have been principally related to the blending of a finished blend of fuel, the invention may be employed to effect substream blending. That is, component streams may be blended together to form a single substream that is only a component of a finished blend of fuel rather than the finished blend itself. The substream as well as its components may be monitored to detect the octane number characteristics thereof, and the blending of the components changed in accordance with the detected octane number characteristics to maintain the substream at a predetermined octane number specification. Thus, the monitoring and blending of components in accordance with the invention may be effected at all the stages of a blending operation.

Accordingly, the invention is not to be deemed limited except as it is defined in the following claims.

What is claimed is:

1. In a method of blending a motor fuel product wherein a plurality of fuel component streams are combined in in-line blending means to provide a blended fuel product stream, the steps comprising introducing a sample of the blended fuel product stream into a single cylinder internal combustion engine to power said engine, generating a signal representative of the knocking propensity of the sample powering said engine, generating an error signal representative of the deviation of the knocking propensity signal from a specified knocking propensity, attenuating said error signal, and modifying the relative proportions of said component streams in response to said attenuated error signal.

2. In a method of in-line blending of a motor fuel having a specified knocking propensity wherein a plurality of component streams are flowed to a blending conduit to provide a continuous stream of a blended motor fuel product, the steps comprising flowing a sample stream of said blended motor fuel product to a single cylinder internal combustion engine, generating a signal representative of the knocking propensity of the motor fuel in said engine, generating an error signal representative of the deviation in the knocking propensity of said sample motor fuel stream from a specified knocking propensity.

generating signals representative of the knocking propensity of each of a plurality of the component streams, attenuating said error signal, and generating in response to the attenuated error signal and the knocking propensity signals of the component streams control signals to adjust the flow rates of the component streams to reduce the error signal.

3. In apparatus for blending motor fuels and the like comprising in-line fluid blender means and a plurality of conduit means for introducing a plurality of motor fuel blending ingredients into said blender means, each of said conduit means having signal responsive flow control means and flow responsive signal generating means, the combination of a plurality of single cylinder engines each having means providing a signal output representative of the knocking propensity of the fuel powering the same;

a plurality of conduit means connected to withdraw sample streams of said blending ingredients from said respective conduit means and a sample stream of blended motor fuel from said blender means and to supply portions of said sample streams as fuel to said single cylinder engines, respectively;

means for generating a reference signal representative of a knocking propensity desired for the motor fuel blend;

means jointly responsive to said reference signal and to the signal output of the engine powered by fuel from the sample stream from said blender for producing a signal representative of the deviation between said engine signal output and said reference signal;

attenuator means for attenuating said deviation representing signal; and computer means connected to receive signals from said conduit means flow responsive signal generating means, and the signal outputs of said plurality of single cylinder engines and said attenuator means, and to supply control signals to said signal responsive flow control means to adjust the same to maintain a predetermined specification for the blended motor fuel output from said blender means.

4. The apparatus of claim 3 further comprising first adder means for combining said attenuated signal and a signal from said computer means representative of the knocking propensity last computed for the motor fuel blend from the blender means.

5. In apparatus for blending motor fuels and the like comprising in-line fluid blender means and a plurality of conduit means for introducing a plurality of motor fuel blending ingredients into said blender means, each of said conduit means having signal responsive flow control means and flow responsive signal generating means, the combination of a plurality of single cylinder engines each having means providing a signal output representative of the knocking propensity of the fuel powering the same;

a plurality of conduit means connected to withdraw sample streams of said blending ingredients from said respective conduit means and a sample stream of blended motor fuel from said blender means and to supply portions of said sample streams as fuel to said single cylinder engines, respectively;

means for generating a reference signal representative of a knocking propensity desired for the motor fuel blend;

means jointly responsive to said reference signal and to the signal output of the engine powered by fuel from the sample stream from said blender for producing a signal representative of the deviation between said engine signal output and said reference signal;

attenuator means for attenuating said deviation representing signal;

first adder means for combining said attenuated signal and a signal from said computer means representative of the knocking propensity last computed for the motor fuel blend from the blender means;

second adder means for combining with the output of said first adder means a constant; and computer means connected to receive signals from said conduit means flow responsive signal generating means, and the signal outputs of said plurality of single cylinder engines and said second adder means, and to supply control signals to said signal responsive flow control means to adjust the same to maintain a predetermined specification for the blended motor fuel output from said blender means.

References Cited

UNITED STATES PATENTS

| | | | |
|---|---|---|---|
| 2,903,417 | 9/1959 | Beaugh et al. | 208—136 |
| 3,000,812 | 9/1961 | Boyd | 208—138 |
| 3,312,102 | 4/1967 | Traver | 73—35 |
| 3,238,765 | 3/1966 | Beal | 73—35 |

PATRICK P. GARVIN, Primary Examiner

U.S Cl. X.R.

73—35; 137—88, 93

UNITED STATES PATENT OFFICE
CERTIFICATE OF CORRECTION

Patent No. 3,503,722    Dated March 31, 1970

Inventor(s) HARRY R. WEBER and DONALD P. HEATH

It is certified that error appears in the above-identified patent and that said Letters Patent are hereby corrected as shown below:

Column 1, line 58, "3,312,182" should read --3,312,102--.
Column 4, line 40, "simple" should read --sample.
Columns 3 and 4, Table 1, should read as follows:

TABLE 1.—SAMPLE DATA MATRIX FOR COMPUTING BLEND COMPOSITION

| Constraints | Component Fractions | | | Anti-Knock Agent Curve Segments | | | Specification Values |
|---|---|---|---|---|---|---|---|
| | $X_A$ | $X_B$ ---- $X_N$ | | $X_1$ | $X_2$ | $X_3$ | |
| Octane Number | $O_A^o$ | $O_B^o$ ---- $O_N^o$ | | +1 | +1 | +1 | $(\geq O_{LC} + T(O^*-O^m)$ <br> $(\leq O_{LC} + T(O^*-O^m) + K$ |
| Anti-knock Agent Segment (1) Limit | $K_A$ | $K_B$ ---- $K_N$ | | +1 | | | $\geq P$ |
| Anti-knock Agent Segment (2) Limit | $K_A'$ | $K_B'$ ---- $K_N'$ | | | +1 | | $\geq P'$ |
| Anti-knock Agent Segment (3) Limit | $K_A''$ | $K_B''$ ---- $K_N''$ | | | | +1 | $\geq P''$ |
| Optimizing Criteria (e.g., costs) | $\$/B_A$ | $\$/B_B$ ---- $\$/B_N$ | | $\$/X_1$ | $\$/X_2$ | $\$/X_3$ | Minimize |
| Production Requirement | +1 | +1 ---- +1 | | | | | = 1 |

Column 10, line 3, "." should read --,--.

SIGNED AND SEALED
AUG 18 1970

(SEAL)
Attest:

Edward M. Fletcher, Jr.
Attesting Officer

WILLIAM E. SCHUYLER, JR.
Commissioner of Patents